(12) United States Patent
May

(10) Patent No.: US 11,411,483 B2
(45) Date of Patent: Aug. 9, 2022

(54) MAGNETIC FIELD PROPULSION DRIVE

(71) Applicant: TOMORROW'S MOTION GMBH, Starnberg (DE)

(72) Inventor: Lutz May, Berg (DE)

(73) Assignee: TOMORROW'S MOTION GMBH, Starnberg (DE)

(*) Notice: Subject to any disclaimer, the term of this patent is extended or adjusted under 35 U.S.C. 154(b) by 329 days.

(21) Appl. No.: 16/761,480

(22) PCT Filed: Nov. 14, 2018

(86) PCT No.: PCT/EP2018/081163
§ 371 (c)(1),
(2) Date: May 4, 2020

(87) PCT Pub. No.: WO2019/096814
PCT Pub. Date: May 23, 2019

(65) Prior Publication Data
US 2020/0389079 A1    Dec. 10, 2020

(30) Foreign Application Priority Data

Nov. 14, 2017 (EP) ...................................... 17201747

(51) Int. Cl.
*H02K 41/00* (2006.01)
*F03H 99/00* (2009.01)
(Continued)

(52) U.S. Cl.
CPC .............. *H02K 41/00* (2013.01); *B60L 50/00* (2019.02); *B64G 1/409* (2013.01); *F03H 99/00* (2013.01);
(Continued)

(58) Field of Classification Search
CPC ........... H01F 7/06; H01F 7/064; H02N 11/00; H02N 15/00; H02K 41/00; H02K 2201/18; F03H 99/00; B60L 50/00; B64G 1/409
(Continued)

(56) References Cited

U.S. PATENT DOCUMENTS 2,892,983 A * 6/1959 Larson .................... H01J 17/04
333/13
3,927,620 A * 12/1975 Clapham ................. B60L 13/10
104/282

(Continued)

FOREIGN PATENT DOCUMENTS

CN          206225545       6/2017
DE    20 2014 001344 U1    4/2014
(Continued)

OTHER PUBLICATIONS

Machine Translation of Iko Japanese Patent Document JP H08-275494 A Oct. 1996 (Year: 1996).*

*Primary Examiner* — Kevin J Comber
(74) *Attorney, Agent, or Firm* — Fay Kaplun & Marcin, LLP

(57) ABSTRACT

A magnetic field propulsion unit includes a magnetic field generating device with multiple conductive lines conduct a current to generate a magnetic field; a contact breaker arrangement individually transitions each of the multiple conductive lines from a conductive state to a non-conductive state; an energy supply unit provides the magnetic field generating device with electrical energy; and a control unit controls the energy supply unit so that energy supply to each individual conductive line is controlled and control the contact breaker arrangement. The multiple conductive lines are arranged along a longitudinal axis. The control unit supplies a first conductive line with electrical energy so that (Continued)

a first magnetic field surrounding the first conductive line is generated, transitions the first conductive line to a non-conductive state, and supplies a second conductive line with electrical energy so that a second magnetic field is generated.

17 Claims, 12 Drawing Sheets

(51) Int. Cl.
  *H02N 11/00* (2006.01)
  *H02N 15/00* (2006.01)
  *B60L 50/00* (2019.01)
  *B64G 1/40* (2006.01)
  *H01F 7/06* (2006.01)
(52) U.S. Cl.
  CPC .............. *H01F 7/064* (2013.01); *H02N 11/00* (2013.01); *H02N 15/00* (2013.01); *H01F 7/06* (2013.01); *H02K 2201/18* (2013.01)

(58) Field of Classification Search
  USPC ......................................................... 361/143
  See application file for complete search history.

(56) References Cited

U.S. PATENT DOCUMENTS

| 5,126,648 | A | * | 6/1992 | Jacobs | ................... | H02K 41/03 |
|---|---|---|---|---|---|---|
| | | | | | | 318/135 |
| 2010/0327669 | A1 | | 12/2010 | Toyota et al. | | |
| 2014/0330353 | A1 | * | 11/2014 | Knight | ............... | A61N 1/36025 |
| | | | | | | 607/101 |
| 2019/0028011 | A1 | | 1/2019 | Hester | | |

FOREIGN PATENT DOCUMENTS

| DE | 202014001344 U1 | * | 5/2014 | ............. A63H 18/14 |
|---|---|---|---|---|
| JP | 61-269661 | | 11/1986 | |
| JP | 08275494 A | * | 10/1996 | |
| JP | H08 275494 | | 10/1996 | |

* cited by examiner

MAGNETIC FIELD PROPULSION DRIVE

TECHNICAL FIELD

This description generally relates to generating a propulsion force, for example by a propulsion drive. Especially, the description relates to a magnetic field propulsion unit, a propulsion drive with such a magnetic field propulsion unit, and an electromagnetic field propulsion unit.

BACKGROUND

Generally, a propulsion drive provides a propulsion force to move a means of transport for people and/or, in general, cargo.

To assist and to support movement of people, animals, and goods, the humans invented several kinds of wheel-based wagons (horse carriages, steam locomotive, etc.) and other types of machineries (like planes and boats). Vessels like wagons, boats, and planes need a propulsion system to move from one to the next location. It is either muscle power (human muscle or animal muscle), renewable energy (wind), or some kind of engine that makes the vessel move.

In this document, the understanding is that the purpose of a "propulsion" system is to move an object. Most of the practiced propulsion solutions are friction based (pressing against the road surface, or propeller pushing against air or water, wind blowing onto a sail, etc.). In the most recent times, some propulsion systems are mass separation based (all types of rocket drives and ion drives, for example).

However, propulsion systems used today are either relying on the presence of friction (the huffs from the horse pushing and scraping against the road surface, or the rotating tire of the car rubbing against the street surface, for example) or they use some kind of physical mass separation process whereby an expendable mass (like a gas, ions, jet of water) is accelerated away from the object that needs to be moved. Of course, all propulsion systems also rely on a source of energy to power the propulsion system.

SUMMARY

There may be a need to reduce dissipation losses of a propulsion drive.

In short, this document describes a third alternative for a more advanced propulsion which is not friction based, nor does it require the acceleration of masses (in the most common sense) that will be pushed away from the object that needs to be moved.

This technology may be named Magnetic Cloud Accelerator, or simply MCA. The objective of an MCA drive system is it to propel (move) a vessel (at which the MCA drive has been installed) in any direction regardless of where the vessel has been placed: in the outer space, flying in the air, or is on the surface of a planet/moon.

An MCA drive unit provides a force, pointing in a selected direction, that acts on a vessel that has to be moved. The directional force is created from within the MCA drive and does not rely on any conditions that are outside the MCA drive. The MCA technology is based on magnetic principles and therefore requires an electrical power source that has to be carried by the vessel where the MCA drive has been installed.

Basically, an MCA drive module consist of an electric power source, at least two or more magnetic field generators (e.g., inductors), and some electronics. To move heavier objects, an MCA drive module with more than two inductors, or more than one MCA drive modules may be needed. The inductors interact with each other to create a propulsion force in a defined direction. Preferably, the inductors are mounted in such way that they keep a constant distance to each other.

According to an aspect, a magnetic field propulsion unit comprises a magnetic field generating device, a contact breaker arrangement, an energy supply unit, and a control unit. The magnetic field generating device comprises multiple conductive lines which are configured to conduct a current so as to generate a magnetic field. The contact breaker arrangement is configured to individually transition each of the multiple conductive lines from a conductive state to a non-conductive state. The energy supply unit is configured to provide the magnetic field generating device with electrical energy. The control unit is configured to control the energy supply unit so that supplying energy to each individual conductive line is controlled and to control the contact breaker arrangement. The multiple conductive lines are arranged along a longitudinal axis. The control unit is configured to supply a first conductive line with electrical energy so that a first magnetic field surrounding the first conductive line is generated, transition the first conductive line to a non-conductive state, supply a second conductive line with electrical energy so that a second magnetic field is generated, wherein the second conductive line is supplied with electrical energy a predetermined period of time after the first conductive line is transitioned to the non-conductive state.

Each of the multiple conductive lines of the magnetic field generating device may be a coil with at least one winding or may be a rod antenna. The individual conductive lines may be separated from each other, i.e., there is no direct electric connection between the individual conductive lines. The conductive lines can be individually provided with electric energy so that each conductive line may generate a magnetic field upon being supplied with an electric signal.

The conductive lines are supplied with electric energy in a specific order. Thus, the magnetic fields generated by the conductive lines are emanated in a similar order. The magnetic field generated by the second conductive line repels from the remainders of the magnetic field generated by the first conductive line after the first conductive line is transitioned to the non-conductive state. This process can be repeated. In this manner, the propulsion force is generated in a pulse mode. The strength of the propulsion pulse may depend on the intensity of the magnetic field which itself depends on the electric energy supplied to the conductive lines.

According to a further embodiment, each of the conductive lines is a coil having at least one winding. Preferably, the coil is an air coil without a core. Preferably, the coil has a diameter between 10 mm and 200 mm.

While in theory it is possible to use inductors (for example a wire-based coil) with a core that has magnetic properties, such inductors with a core have the disadvantage that their reaction time to high frequencies is very slow. The inductors described in this document are air-coils that have a very few windings only.

According to a further embodiment, the coils are identical in size and have the same number of windings.

According to a further embodiment, the coils are arranged in a linear manner and are equally spaced apart from each other at a predetermined distance.

According to a further embodiment, for each conductive line, the control unit is configured to repeatedly carry out the following cycle, which cycle may be referred to as switching period: supply a positive current for a first period of time, transition the conductive line to a non-conductive state for a second period of time, supply a negative current for a third period of time, transition the conductive line to a non-conductive state for a fourth period of time.

Preferably, a duration of the third period of time is equal to a duration of the first period of time. Preferably, a duration of the fourth period of time is equal to a duration of the second period of time.

The cycle described in this embodiment is carried out for every conductive line. However, the cycle is phase-shifted for neighboring conductive lines, i.e., while a first conductive line is supplied with a positive current (first period of time), a second conductive line is in the non-conductive state (second period of time). In other words, the cycle between neighboring conductive lines is phase-shifted by 90° (one quarter of Pi).

According to a further embodiment, the switching period of a first conductive line is phase-shifted for a quarter period with respect to a switching period of a second conductive line, wherein the first conductive line and the second conductive line are arranged next to each other with a predetermined distance in between, such that the magnetic field propulsion unit generates a force pulse in a direction from the first conductive line to the second conductive line.

According to a further embodiment, the coils are planar coils. Preferably, the coils are arranged in the same plane. More preferably, all coils of the magnetic field generating device are arranged in the same plane.

According to a further embodiment, the conductive lines are arranged in a matrix-like structure with multiple lines and columns, wherein the conductive lines in one column or in one line are controlled in accordance with the switching period referred to above, so that any line and any column may be selectively used as a magnetic field propulsion unit.

According to a further embodiment, the contact breaker arrangement comprises multiple contact breakers, wherein at least one contact breaker is assigned to each conductive line and arranged such that the contact breaker breaks the conductive line so that a flowing current through the conductive line is prevented.

The contact breaker is arranged such that it transitions the coil in an open state when the contact breaker is in the open state. In other words, the continuous wire of the coil is interrupted by the contact breaker. The contact breaker may be a switch. The contract breaker may be arranged close to the conductive wire of a coil so that the interconnecting line between the contact breaker and the coil is much shorter than the circumference of the coil. For example, the length of the interconnecting line between the coil and the contact breaker is less than 25% of the circumference of the coil, more preferably less than 20% of the circumference of the coil, more preferably less than 15% of the circumference of the coil, and even more preferably less than 10% of the circumference of the coil.

According to a further embodiment, a contact breaker is a semiconductor element, preferably a transistor, that can selectively be in an electrically conductive state or in an electrically non-conductive state. The contact breaker interconnects a first section of the conductive line with a second section of the conductive line so as to form a continuous conductive line when the semiconductor element is in the electrically conductive state.

For example, one coil may be separated in two sections that are interconnected by two contact breakers. If both contact breakers are in a closed state, the two sections establish one closed loop of a coil. If one contact breaker is open, the wire of the coil is a C-shaped wire that is open at one end (where the contact breaker is open). Of both contact breakers are open, the former coil now is two separated sections of a wire.

In other words, by providing at least two or multiple contact breakers that are arranged circumferentially at a coil to interrupt the continuous wire of the coil in multiple sections, the properties of the coil can be selectively changed from being a coil to being separate sections of a wire.

According to a further embodiment, at least one of the conductive lines is tubular and has an inner chamber that is filled with a semi-conductive fluid, preferably a semi-conductive liquid.

Thus, the electric properties of the tubular line may be changed by changing the properties of the liquid from electrically conductive to electrically non-conductive. In this embodiment, it may not be necessary to physically interrupt the conductive line.

According to a further aspect, a propulsion drive with a magnetic field propulsion unit as described herein is provided. The magnetic field propulsion unit is arranged such that a force pulse is generated in a direction of the longitudinal axis.

Such a propulsion drive can be used to exert a propulsion force to a vehicle or element. For this purpose, the propulsion drive is attached or mounted to the vehicle or element.

According to a further aspect, an electromagnetic field propulsion unit is provided. The electromagnetic field propulsion unit comprises an electromagnetic field generating device, an energy supply unit, a control unit. The electromagnetic field generating device comprises multiple generating units which are configured to generate an electromagnetic field. The energy supply unit is configured to provide the electromagnetic field generating device with electrical energy, preferably alternating current at a given frequency. The control unit is configured to selectively pass the electrical energy from the energy supply unit to the generating units. The control unit is configured to control the energy supply unit so that the process of supplying energy to each individual generating unit is controlled. The multiple generating units are rod-shaped and arranged along a linear axis and the generating units are parallel to each other. The control unit is configured to supply a first generating unit with electrical energy so that a first electromagnetic field is generated, break the energy supply to the first generating unit, and supply a second generating unit with electrical energy so that a second electromagnetic field is generated. The second generating unit is supplied with electrical energy a predetermined period of time after the energy supply to the first generating unit is broken.

According to an embodiment, the multiple generating units are antennas that have a same length and are arranged along a common line and are arranged equidistantly with respect to each other.

These and other aspects of the present invention will become apparent from and elucidated with reference to the exemplary embodiments described hereinafter.

DETAILED DESCRIPTION OF THE INVENTION

Figure 1:
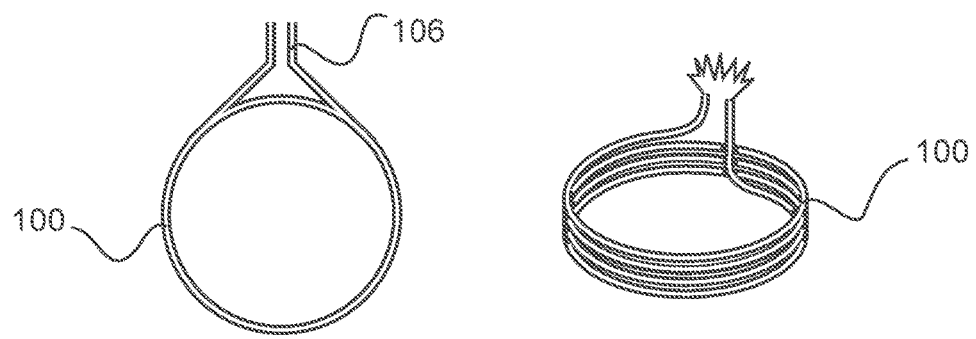
FIG. 1 schematically shows an air coil.

FIG. 1 shows an air coil in two different views. The air coil is made of a wire and has at least one complete winding. Electric energy is supplied to the air coil via energy supply lines 106.

Generally, when supplying electric energy to the coil 100, a magnetic field is generated surrounding the wire of the coil. When the flow of the electric current in an inductor will be cut-off suddenly, then a counter-electromotive force (also known as back electromotive force, back EMF) will cause the built-up of a high voltage at the energy supply lines 106 (two leads) of the inductor 100. Depending on the inductor specifications and the electric current that has been flowing through the inductor, the voltage built-up can be high enough to create electric sparks, as shown in FIG. 1 on the right. This phenomenon is identical to what is happening in an ignition coil (used in some types of combustion engines).

The magnetic field that surrounds the inductor is using the conductive wire in the coil to create a current flow (in the opposite direction) that will built-up to a very high voltage at the energy supply lines 106 of the inductor (assuming that the two connection wires of the inductor are not connected to any circuit). The voltage built-up will keep going until either the previously generated magnetic field has been used-up (collapsed) in this process or until a spark is flying across the inductor lead-ends (shortening the coil circuit). The electric spark will then allow a current to flow in the coil until the generated voltage will drop to a certain lower level.

After the process of creating the magnetic field stops (for example by cutting-off the electric supply current), the created magnetic field that surrounds the inductor begins to transfer its energy back into the inductor, and with this creates an electric current flow (back EMF). This process of the back EMF creation takes time, even when it is only a few hundred pico seconds. However, it is to be noted that the magnetic flux structure exists on its own after the electric current supply has been cut-off and the magnetic flux structure is able to do utilize its energy for a short time after.

As long as the inductor is powered by an external electric current source via the energy supply lines 106, the created magnetic field structure is anchored (held in place) to the center of the inductor 100. When the external electric current supply is cut-off, the created magnetic field structure is no longer anchored to the source (the electrically powered inductor 100). The magnetic field structure is now free to move. However, any movement (changing of its position) of a magnetic field at the presence of an electric conductive object (surface, wire) will create an electric current flow in that object, thus transforming the energy of the magnetic field back to electric energy. Furthermore, any attempted movement of the magnetic flux structure will happen with a speed that is near the lightspeed. The larger the magnetic field structure is, and the lower the impedance in the conductive object is, the larger the electric current flow in the conductive object (for a short time). The back EMF will rapidly drain the energy stored in the magnetic field structure (however, it will take some time, even when only a little). By the way, instead of magnetic field structure the term "magnetic cloud" is often used.

When the inductor (air coil 100) no longer is powered by an electric current, and when the physical properties of the air-coil will change in such way that it will not be possible for the creation of a back EMF (or counter-electromotive force), then the magnetic field created by the electric current is no longer bound (anchored) to the air-coil. This is not the case for a typical inductor (or coil). Basically, this means the inductor has to disappear at an instant (also here referred to as "deactivating" the inductor).

For the MCA technology to work, the process caused by the counter electromotive force has to be prevented by making the inductor "disappear" (eliminate or reduce its effect of transforming the energy of the magnetic field into electric current) at the same time the supply current will be cut-off.

Figure 2:
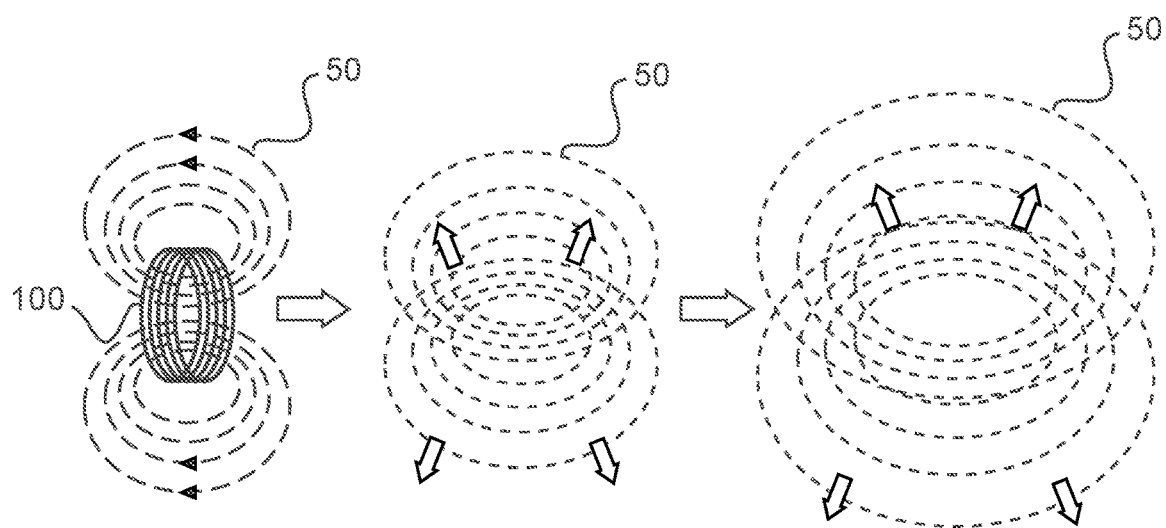
FIG. 2 schematically shows a coil together with a magnetic field and the propagation of a magnetic field.

FIG. 2 exemplarily shows how a coil 100 generates a magnetic field 50 when being supplied with electric current. It is furthermore schematically shown in FIG. 2 how magnetic fields propagate in space. FIG. 2 shows what happens when a coil just disappears after it has generated a magnetic field. Of course, a coil cannot just disappear. However, the explanations given below show how the magnetic field is used to generate a propulsion force.

When cutting off the electric power source to an air-coil, and when ensuring that the property of the air-coil has changed in such way that it is no longer conductive object (drastically increasing the impedance of the entire air-coil device so that what remains takes no longer part in the dynamics that surrounds the magnetic field generated), then the magnetic field structure 50 (the magnetic field cloud generated by the air-coil while under electric power) will expand outwards in all directions and will disperse with nearly the speed of light.

In FIG. 2 on the left, it is shown that an electric current flowing through the coil 100 (in this specific example an air-coil) creates a magnetic field structure 50 similar to the shape of an apple that is bound (anchored) to the powered coil 100. After the electric power has been cut-off and the inductor lost its properties as a conductive object, the magnetic field surrounding the inductor is no longer anchored to the position of the former inductor, and therefore begins to expand outwards rapidly while dispersing, as shown in FIG. 2 in the middle. The magnetic field loop (originally shaped as a toroid) expands in all directions with near the speed of light. The field strength of the magnetic flux lines gets rapidly smaller the larger the magnetic toroid is getting, as shown in FIG. 2 on the right.

Although the term "dispersing" has been used herein, energy will not just simply disappear. However, whenever the flux lines of the outwardly expanding magnetic structure come across a conductive object, the process of the back EMF creation will happen. Only in a truly empty universe (space) the magnetic field structure will expand continuedly without losing any of its energy.

Figure 3:
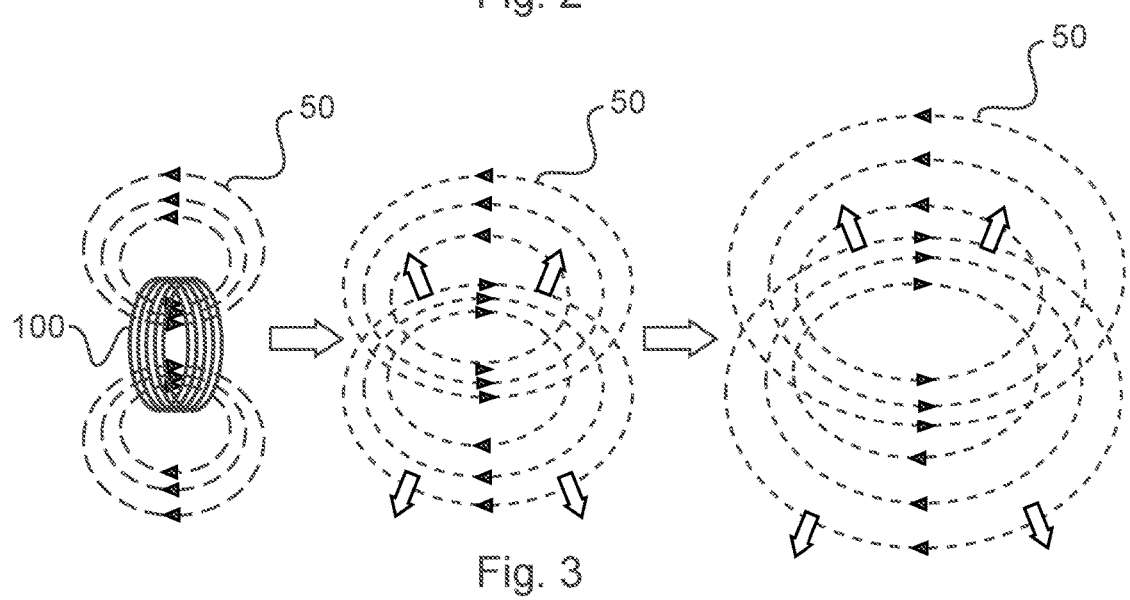
FIG. 3 schematically shows a coil together with a magnetic field and the propagation of a magnetic field.

FIG. 3 schematically shows the magnetic field lines of a magnetic field generated by a coil and what happens to the magnetic field when the coil instantly disappears. When an electric current is flowing through the inductor 100, then the generated magnetic field that surrounds the inductor has a three-dimensional shape similar to an apple. This magnetic field structure is anchored to the center of the inductor 100. As soon as the inductor has been deactivated (there will be no conductive structure present where the magnetic field structure was anchored before), the magnetic field structure will rapidly expand outwards in all direction, as shown in the schematic drawing in the middle. In the way the apple like structure is expanding inwards and outwards (basically into all directions with the same speed at the same time) the formerly apple like structure (magnetic field cloud) will convert into a doughnut shaped structure (or toroidal shaped) that expands outwards, as shown in FIG. 3 on the right.

Figure 4:
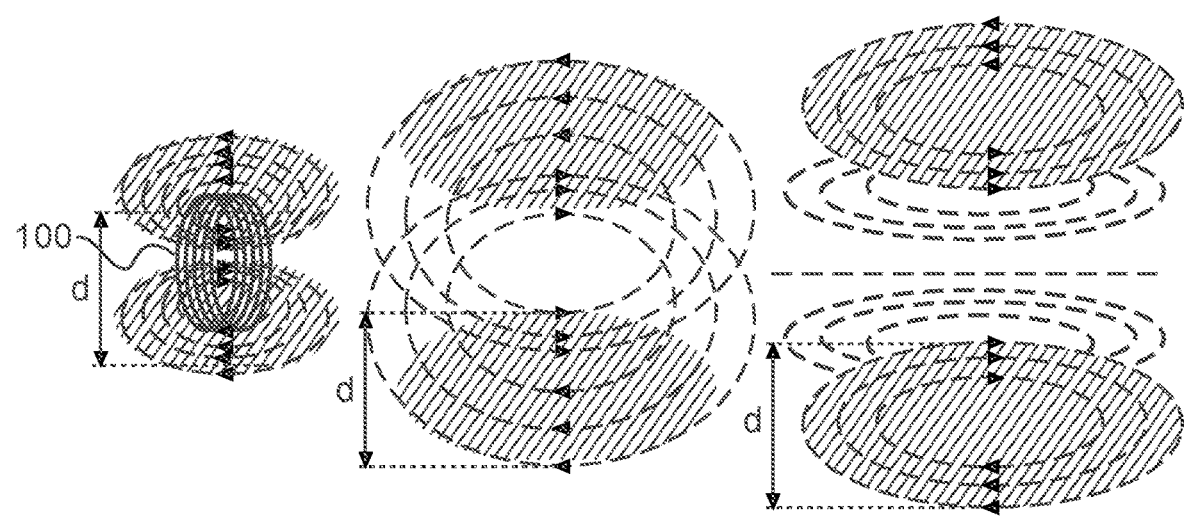
FIG. 4 schematically shows a coil together with a magnetic field and the propagation of a magnetic field.

FIG. 4 shows the formation of the toroidal magnetic field shape as a consequence of the apple like shape expanding inwards and outwards simultaneously. While the diameter of the doughnut shaped magnetic field structure expands rapidly, the diameter d of the field structure (the wall thickness of the magnetic doughnut, here called "d") remains constant and this field structure propagates in space outwardly, i.e., away from the opposite side of the field structure.

Figure 5:
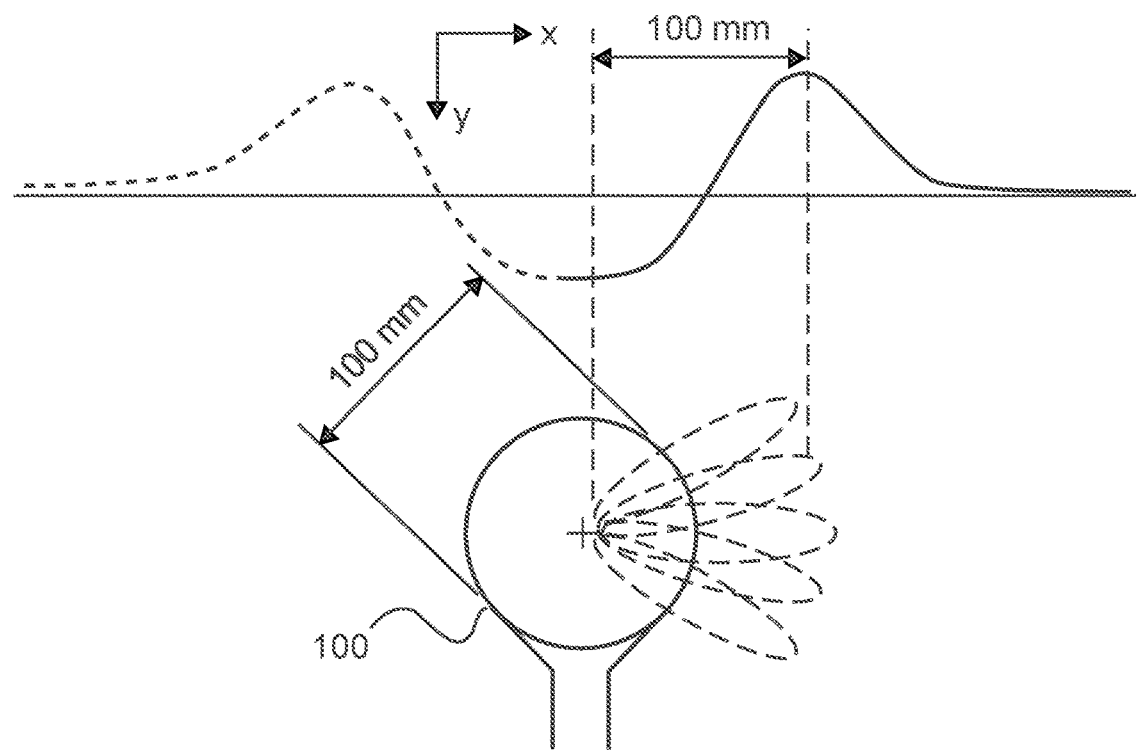
FIG. 5 schematically shows the magnetic field intensity of a coil.

FIG. 5 shows the magnetic field intensity with respect to the distance from the center of the coil 100. In this example, the air coil diameter is about 100 mm and the magnetic field intensity profile is measured in the Z-Axis direction (in axial direction of the inductor). The intensity will have one field intensity maximum in negative direction and one field intensity maximum in positive direction (when taking measurements starting from the center of the air coil and then moving into one direction outwards going in the X-axis). The distance between the negative and the positive maximum is around 100 mm and is constant (described before as "d"). The number of wire-turns of the air-coil used for this example is less than 10 turns. However, the number of wire-turns is to be understood as a non-limiting parameter.

Figure 6:
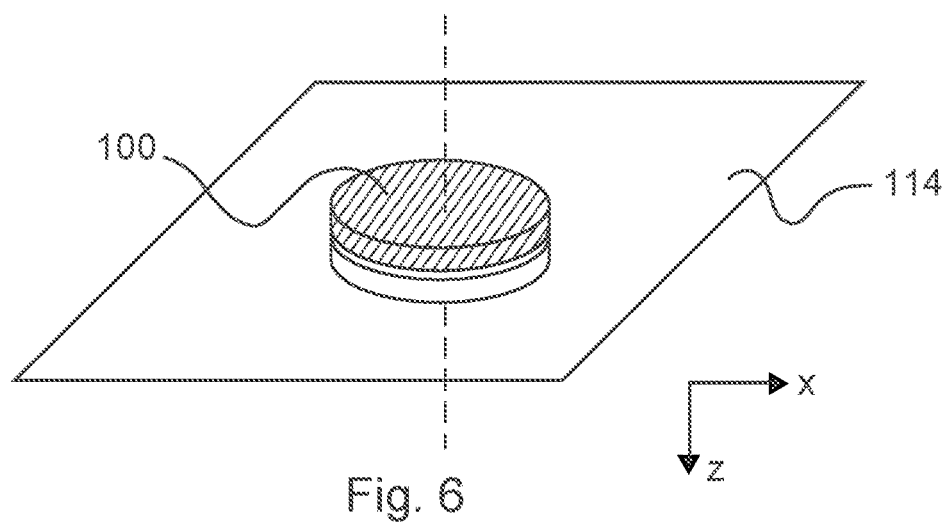
FIG. 6 schematically shows the measuring of the magnetic field intensity of FIG. 5.

FIG. 6 shows a planar coil 100 that is located in a plane 114. The Z-Axis extends in axial direction of the coil 100. The Z-Axis is the direction of measuring the magnetic field intensity shown in FIG. 5.

Since the magnetic field is symmetric, the magnetic field intensity measured in the Z-axis (as the drawing shows in FIG. 5) is identical in any direction in the X-axis plane of the air-coil, starting at the center.

Figure 7:
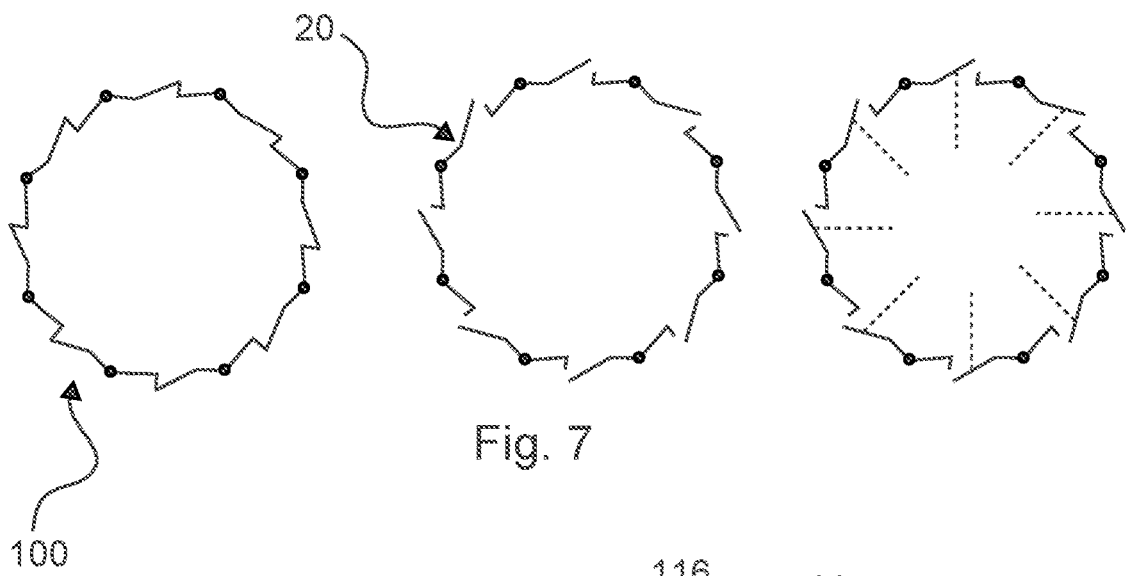
FIG. 7 schematically shows an approach for changing the properties of a coil.

FIG. 7 shows a coil 100 with multiple switches 20 arranged such that the coil can be interrupted to be single individual circumferential segments that are not interconnected to each other. The switches are controllable and can change from an open state to a closed state. In the open state, the switches are electrically non-conductive. In the closed state, the switches are electrically conductive. When the switches are closed, the coil 100 has certain properties, it basically can generate a magnetic field when supplied with electric current. However, if the switches (at least two of them) are in the open state, the properties of the coil (more exactly: of the individual segments resulting from the switches being in the open state) are different from the properties when all of the switches are in the closed state.

There are several design options that can be chosen to achieve the goal of changing the property of an inductor is such way that the function of an inductor no longer exists or significantly changes. FIG. 7 shows a principal idea of such a convertible coil, i.e., a coil that can change its electromagnetic or magnetic behavior. However, besides making the function of the inductor disappear, it is also important to increase the impedance of the remaining object to prevent the built-up of the back EMF. When referring to making a coil disappear, this is to be understood as changing the electromagnetic or magnetic properties of the coil.

FIG. 7 shows an example to make the air-coil change its properties in an instant. In this example, eight mechanical on-off switches are used, that, when the switches are connected to each other (all switches in the closed state, FIG. 7 on the left) and when the switches are in the "on" condition will form an inductor. When the eight switches go from the "on" state into the "off" state (FIG. 7, middle), then the function of an inductor has disappeared at an instant. The eight switches in this example will be instructed what to do by a mechanical or electronical control mechanism which is referred to as control unit. Whatever this mechanism may be, great care has to be taken that this switch control mechanism does not create another opportunity for the back EMF to act on.

The control unit may be a microprocessor or a computer that is configured to provide signals based on which the switches change their state from open to close or vice versa.

Figure 8:
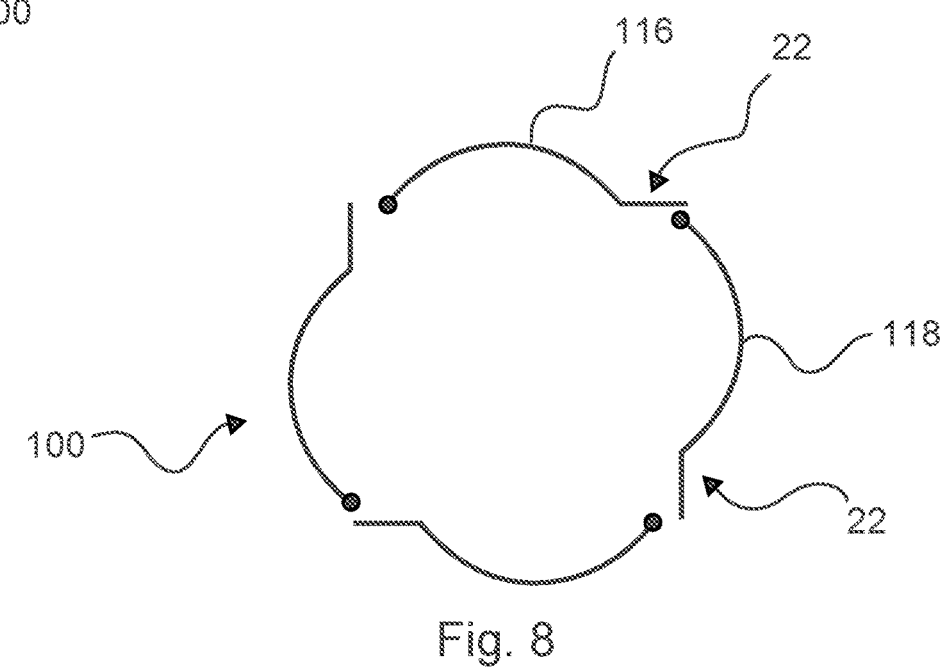
FIG. 8 schematically shows an interruptible air coil with multiple switches.

FIG. 8 shows an air coil 100 having four switches 22 that are arranged to split up the coil into four segments or sections of which a first section 116 and a second section 118 are indicated by reference numbers. When the four switches are closed, an air coil exists with its specific electromagnetic properties. When all four switches are open, four individual and separated sections of the coil wire exist.

The switches may be arranged locally so that their internal wiring is part of the coil and the circumferential shape of the coil wire is substantially provided.

Figure 9:
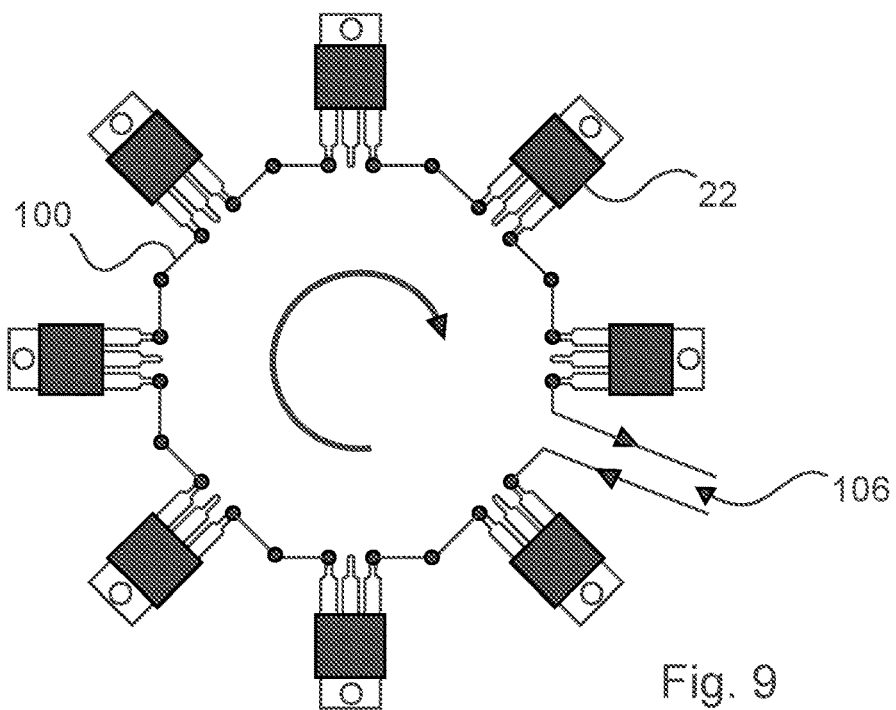
FIG. 9 schematically shows an interruptible air coil with multiple switches.

FIG. 9 shows a coil 100 with eight solid-state switches that are arranged equidistantly at the circumference of the coil 100. Two neighboring switches are arranged at an angle of 45° with respect to the center of the coil 100.

In contrast to mechanical switches, a far better and more practical option is to use very low impedance, high power capable solid-state switches. The important specifications for such a solid-state switch are very short switch-on and switching off times and a very low impedance in the closed state.

Figure 10:
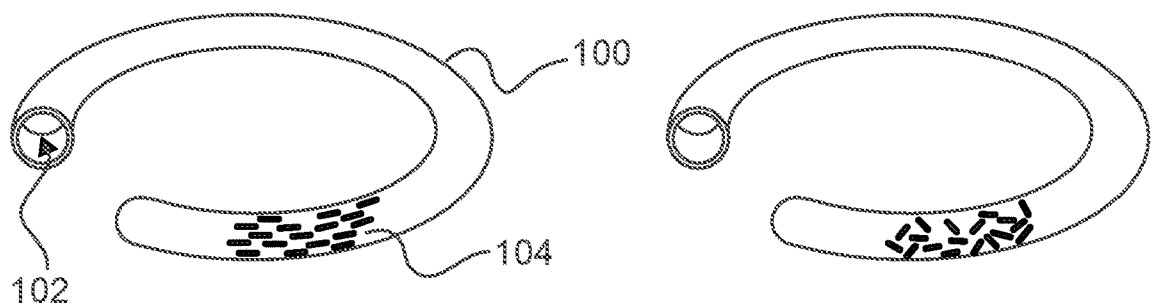
FIG. 10 schematically shows a coil with a semi-conductive fluid.

FIG. 10 shows an alternative example of a coil 100. Instead of using mechanical or physical switches or solid-state switches, a semi-conductive substance (solid or liquid) can be used.

Depending on the chosen control condition, this substance is electrically conductive, or it is electrically non-conductive. However, some of the semi-conductive substances take some time to change from one state to the other and then back again. The benefit of this solution is that function of the inductor has truly disappeared and that the remaining object will not allow the back EMF to take place.

Instead of using an electrically conductive wire, a tube-like structure is used to built-up the coil. The tube comprises an inner chamber 102 in which the semi-conductive fluid is arranged. A signal of the control unit can be used to change the properties of the fluid from electrically conductive to electrically non-conductive.

However, the person skilled in the art appreciates that the principles described herein may be applied to a coil consisting of wires being interrupted by physical switches or solid-state switches or to a coil as shown in FIG. 10.

In the drawing shown in FIG. 10 on the left, the semi-conductive fluid is in conductive state while it is in the non-conductive state on the right.

A coil 100 is formed using a synthetic material pipe, filled with semi-conductive liquid. This pipe can become an inductor or can become a non-conductive structure that will have no or almost no measurable magnetic properties.

Figure 11:
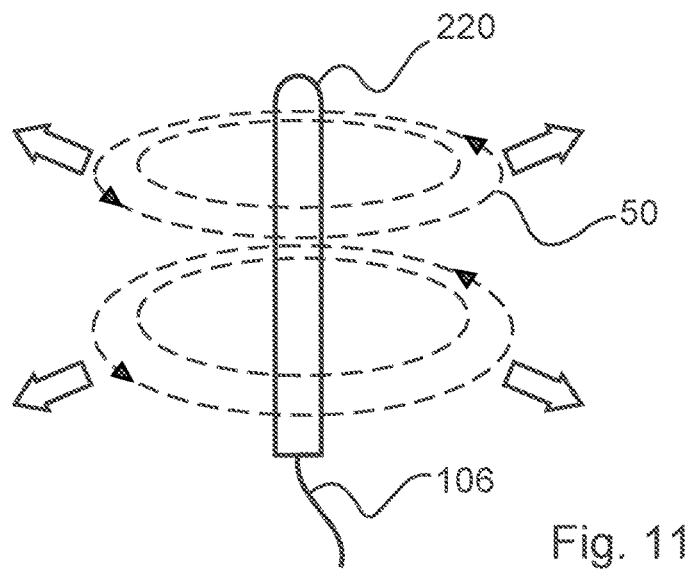
FIG. 11 schematically shows a rod antenna with a magnetic field generated thereby.

FIG. 11 shows a rod antenna which is generally referred to as electromagnetic field generating unit 220. The rod antenna generates an electromagnetic field 50 when being supplied with a suitable electric signal via energy supply line 106.

Instead of a wire-wound-coil-style inductor as shown in FIG. 1 through 10, a simple radio antenna 220 can be used as well. Depending on the speed (operational frequency) with which the antenna style inductor will be operated, the absolute length of the antenna-style inductor can be relatively short. Assuming that the operational frequency will be 1.5 GHz, the optional antenna length will be 50 mm (one quarter of c/f).

The generated magnetic field structure can expand freely in any direction after the power signal has been applied to the antenna 220.

One advantage when using an antenna instead of a coil is that there will be only a relatively small or no back EMF when the signal power to the antenna has been cut off. The magnetic structure is free to expand in the horizontal direction in any direction. There is no need to be concerned about a circuit that makes the inductor disappear.

Figure 12:
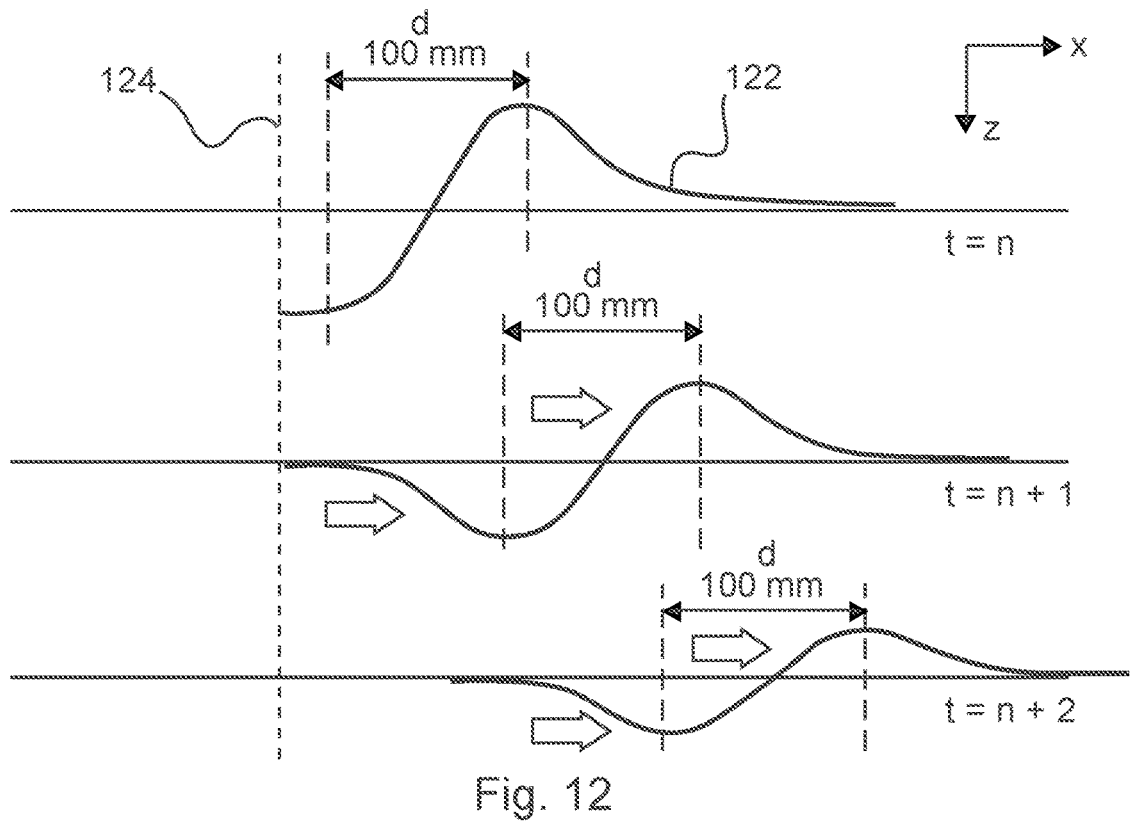
FIG. 12 schematically shows expansion and dispersion of the magnetic field.

FIG. 12 exemplarily shows propagation of a magnetic field and its intensity as a function of time. The magnetic field intensity is shown at three different points of time, namely n, n+1, and n+2. The magnetic field intensity 122 is shown with respect to the center of the inductor 100.

The schematic representation in FIG. 12 is shown based on the assumption that the function of an inductor will disappear at an instant. In such a case, the created magnetic field will travel outwards in all directions (mainly at the horizontal plane in relation to the air-coil).

As already shown in FIGS. 2 to 4, the magnetic field is now no longer locked or anchored to the center position of the air-coil and expands in all directions. By doing so, the field intensity is rapidly diminishing with increasing distance to the center of the air-coil. FIG. 12 shows the field intensity status 122 at three successive time events (n, n+1, and n+2). The physical dimension of the magnetic 'wave' "d" remains constant (in this example 100 mm from the positive field intensity maxima to the negative field intensity maxima).

In the above chosen example of an inductor with a diameter of 100 mm, the radial length (in the X-axis direction) of the magnetic field wave (positive maxima to negative maxima) that expands away from the originating location (after the inductor has been factually deactivated) has a length of 100 mm that is similar to the diameter of the inductor. This is equivalent of 180 deg of a full cycle wave. Meaning that the complete length of a full cycle wave (equivalent to 360 deg) is about 200 mm long (2×d).

Taking the speed of light, with which this magnetic wave expands outwards, the 200 mm wave length is equivalent to a wave-length-time of 660 pico-seconds (or in reciprocal form: equivalent to a 1.5 GHz frequency).

To achieve maximum system efficiency (in the meaning of the propulsion force) the electric pulse with which the inductor will be powered will have a length of only a few hundred pico-seconds (pulse time).

However, this pulse time applies to a coil with 100 mm diameter. When choosing a smaller diameter for the inductor then the pulse time will get smaller (in a ratio metric fashion), or with other words, the operational frequency will increase. Reciprocal, when choosing a much larger diameter for the inductor, then the pulse time will also increase.

Figure 13:
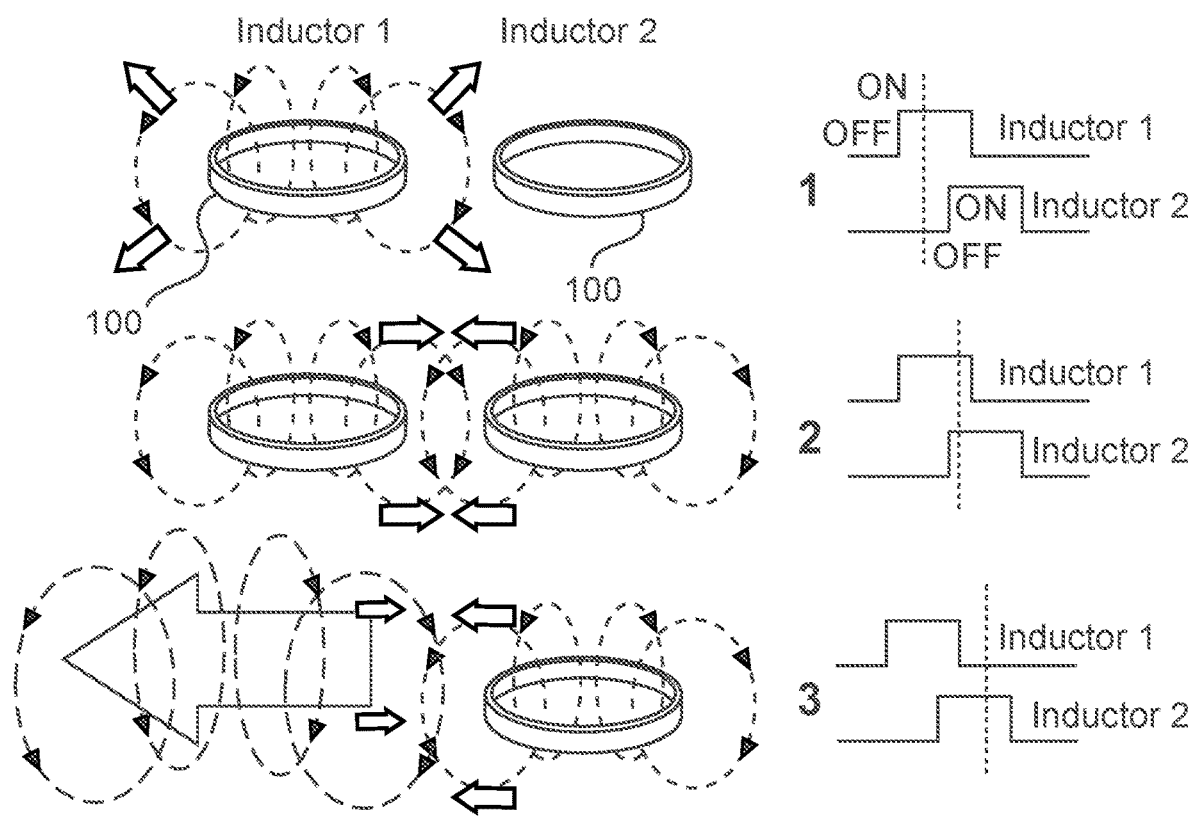
FIG. 13 schematically shows the interaction between two neighboring coils.

FIG. 13 shows two coils 100 named inductor 1 and inductor 2. The two coils are placed in the same plane, i.e., their axes are parallel, and they are arranged at the same vertical level.

At phase 1 (upper drawing), an electric current will flow through the first inductor (air coil 1, on the left). An outward acting magnetic flux structure (in the shape of an apple) builds-up and is anchored to the center of inductor 1. At phase 1, the power switch of inductor 1 is closed, i.e., electric power is supplied to inductor 1, and the power switch of inductor 2 is open, i.e., no electric power is supplied to inductor 2. The state of the power switches is indicated by the vertical dotted line in the drawing on the right at phase 1.

At phase 2 (middle drawing), an electric current is flowing through both inductors 1 and 2. As the current flows in the same direction (inductor 1 and 2), the built-up magnetic structures are repelling each other. The power switches of both inductors are closed, see status of the switches in the drawing on the right of phase 2.

At phase 3, inductor 1 will deactivate (will disappear, its power switch is open). There will be no current flowing through the inductor 1. The magnetic structure created by inductor 1 has no anchor point anymore and will rapidly expand and will quickly reduce its field intensity. The repelling force from the still powered inductor 2 is pushing the magnetic flux structure from the former inductor 1 away. A very small propulsion force will act on the inductor 2 pushing it towards the right of the drawing.

In the here used example (100 mm diameter coil), the whole process of phase 1 to phase 3 will take less than 1 ns (one Nano second). This process (phase 1 to phase 3) can be repeated around 1 billion times (10E9) per second.

Figure 14:
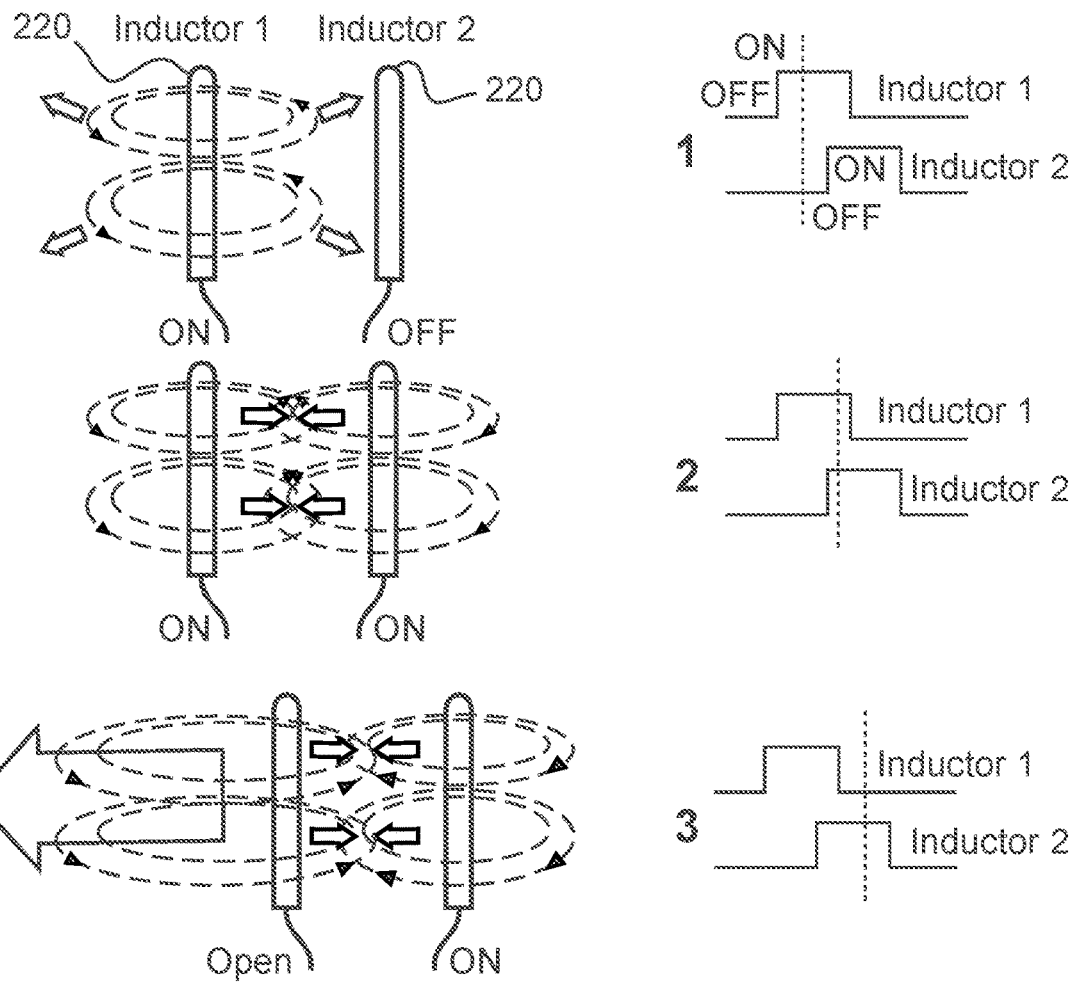
FIG. 14 schematically shows the interaction between two neighboring rod antennas.

FIG. 14 describes a similar design to FIG. 13. However, in FIG. 14, rod antennas are used instead of air coils. The principles described with reference to FIG. 13 also apply to the device shown in FIG. 14 and the rod antennas 220 are controlled in a similar manner, see sequences of power supply on the right of the drawings for the three phases of FIG. 14. This sequence corresponds to the sequence of the power supply of FIG. 13.

When using antenna-style inductors (for inductor 1 and 2), then the principle of the propulsion system described in FIG. 14 remains the same as described with reference to FIG. 13. The explanations given before are also applicable to this inductor arrangement with the exception that there is no need to make the inductor 1 (antenna 1) in phase 3 of FIG. 14 disappear. It is sufficient that the inductor 1 is open loop and not connected to any circuitry or to any power.

Figure 15:
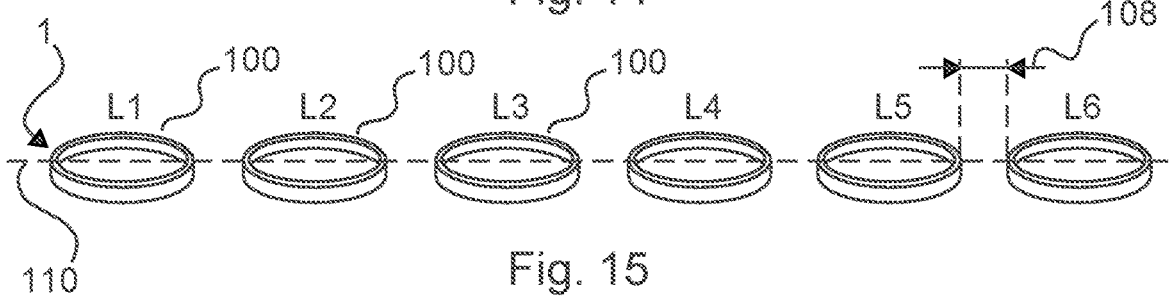
FIG. 15 schematically shows a magnetic field propulsion unit.

FIG. 15 shows a propulsion unit 1 having six air coils L1, L2, L3, L4, L5, and L6. The air coils are arranged along a common longitudinal axis 110. The distance 108 between adjacent or neighboring coils is same. The distance 108 may be between 1.1 to 1.5 time the diameter of the air coils.

Figure 16:
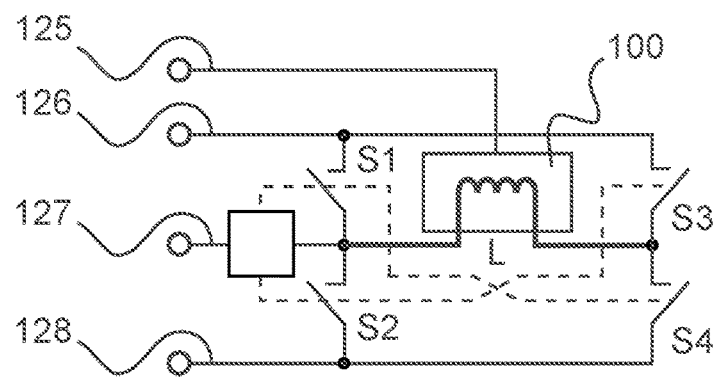
FIG. 16 schematically shows an air coil with power supply and control interfaces.

FIG. 16 shows an air coil including command interfaces for controlling and supplying energy to the coil 100.

Each inductor 100 may be operated in one of three possible operating conditions: electric current flowing in forward direction through it, electric current flowing in reverse direction through it, and the inductor is deactivated (contact breakers 22 are open, see FIG. 7 through 9, coil is no longer electrically conductive as also shown in FIG. 10, in other words, inductor's properties have changed and consequently no current will flow).

The above functional block diagram shown in FIG. 16 is one of several options available. Of course, the propulsion unit will also function if run with only two operating conditions: current will flow in one direction only, and the inductor has been deactivated. However, running the inductor in three operating conditions may increase the efficiency of the propulsion unit.

There are two control inputs 125, 127 that will define the function and operation of the air-coil 100: the first interface 125 activates and deactivates the inductor by opening or closing the contact breaker 22), and the third interface 127 determines the direction of flow of the supplied electrical current by closing or opening the assigned switches S1, S2, S3, S4 accordingly (forwards or backwards).

Power is supplied to the coil 100 via the second interface 126, and the coil 100 is connected to ground via the fourth interface 128. The current flows in a first direction through the coil 100 from the second interface 126 to the fourth interface 128 if the switches S1 and S4 are closed while the switches S2 and S3 are open. The current flows in the opposite direction through the coil 100 if S3 and S2 are closed while S1 and S4 are open.

Figure 17:
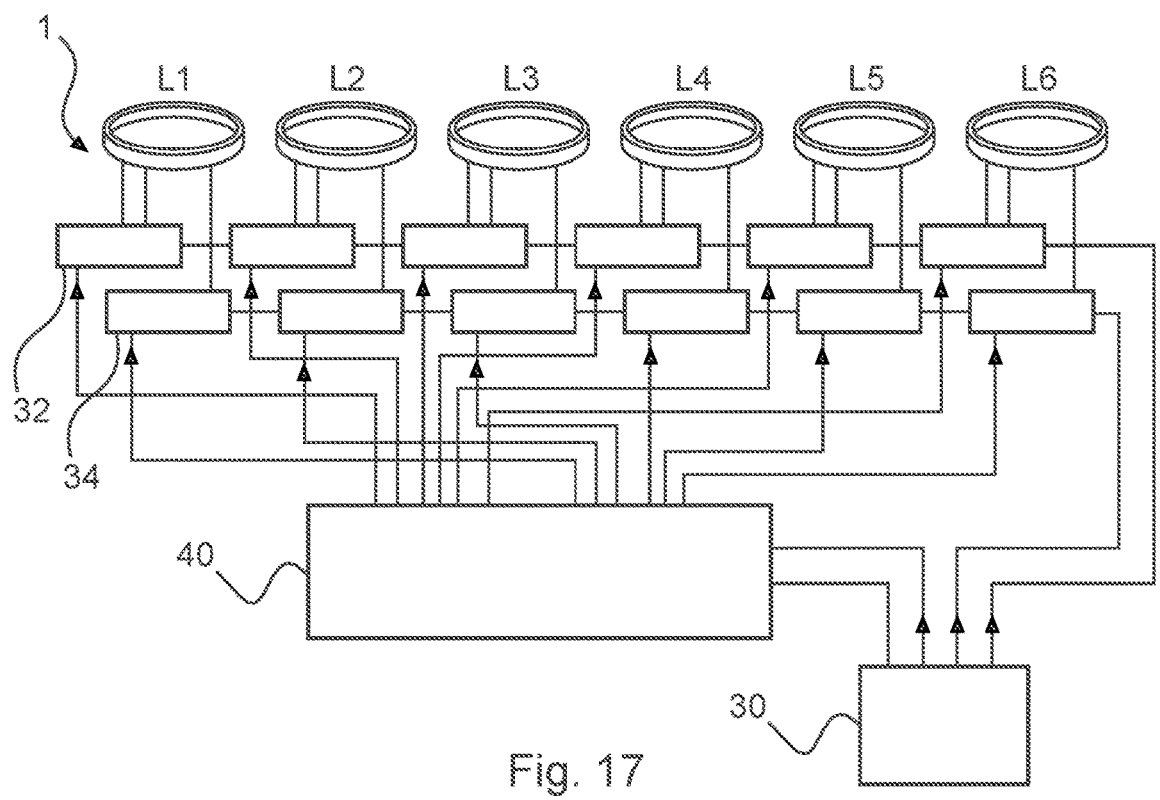
FIG. 17 schematically shows a magnetic field propulsion unit.

FIG. 17 shows a magnetic field propulsion unit with six coils L1 to L6 (similar to FIG. 15) and the corresponding control as well as power supply. An energy supply unit 30 provides power to the controller 40 and to the power drivers 32 (each coil is assigned an individual power driver that provides electrical energy to that specific coil) and to the deactivation unit 34 (the deactivation unit controls the contact breakers 22 of each coil L1 to L6 and determines if the contact breakers are open or closed; each coil is assigned one deactivation unit). However, multiple power drivers 32 or multiple deactivation units 34 may be arranged within a single component while the function described herein is fulfilled by that component.

It is noted that every coil 100 shown in any embodiment herein comprises contact breakers 22 as described with reference to FIG. 7 through 9 or a similar entity for changing the electromagnetic properties of the inductor 100. For example, even if these contact breakers are not shown in FIG. 17, the coils comprise these contact breakers which are controlled by the deactivation unit 34.

The control unit 40 provides control signals to the power driver 32 and deactivation unit 34. Thus, the switching scheme generally described with reference to FIG. 13 is implemented. However, the switching scheme for the power unit with six coils is described in more detail below.

The six air coils L1 to L6 are connected to six enabling circuits (each of them will activate or deactivate the function of a specific inductor) and a power driver 32. The power driver circuit for each inductor has to be able to provide a relatively large supply current in bidirectional direction in a very short time. The deactivation unit 34 or deactivation driver modules and the power diver modules 32 are then controlled by a control unit 40. All driver circuits are connected to the energy supply unit 30.

Figure 18:
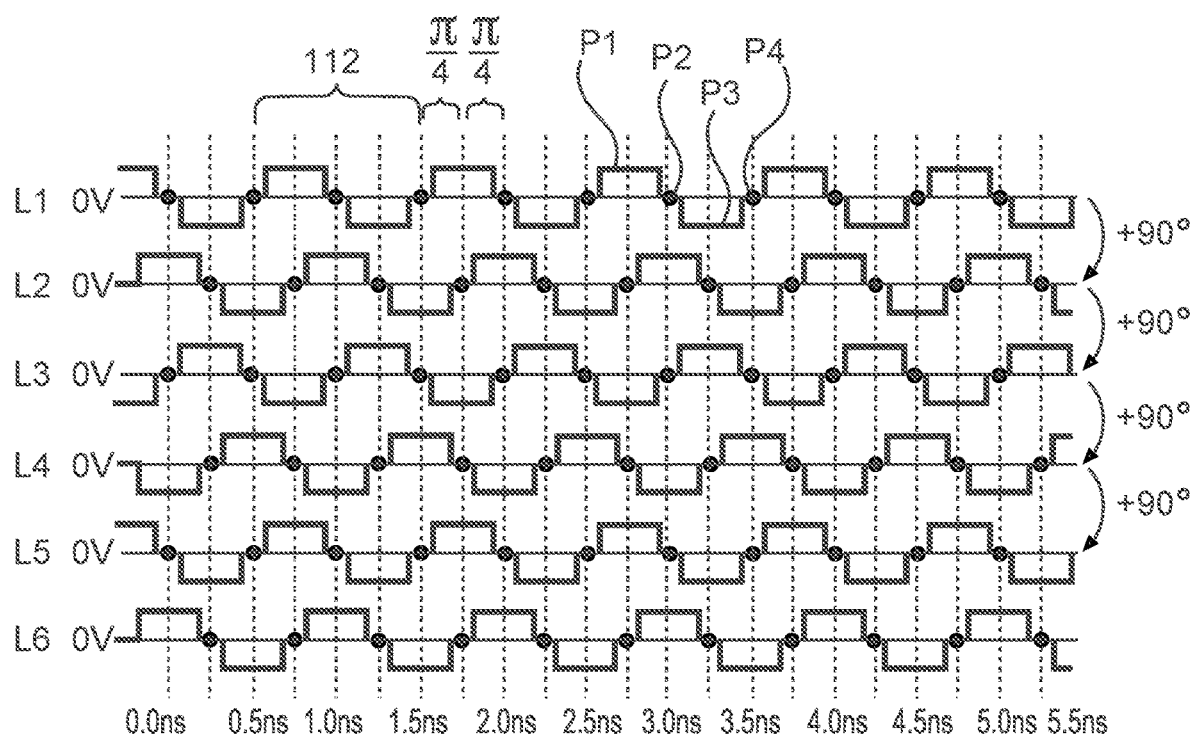
FIG. 18 schematically shows a switching scheme of the magnetic field propulsion unit.

FIG. 18 shows the switching scheme for the coils L1 to L6 of the magnetic field propulsion unit described with reference to FIG. 17.

The switching scheme is the electric powering sequence (control voltage signals for the six power drivers 32 over a 5 ns time) for six air-coils that have been placed in-line side-by-side. The sequence in FIG. 18 represents the activities over a 5-Nano second time. During this 5 ns, the air-coil array has generated 20 thrust pulses (marked with dashed vertical lines) in one direction (in-line to the air-coil array). This represents one thrust pulse every 250 ps (pico second). This is equivalent to an oscillation frequency of the propulsion unit of 4 GHz (for an air-coil diameter of around 100 mm in a "flat", side-by-side arrangement).

The vertical dashed lines represent when a thrust pulse occurs. In this configuration, three out of the six coils create the thrust pulse at a given time.

The dots on the 0 Volt line for each control signal indicate when the inductor has been completely deactivated (contact breakers 22 are open, the coil is no longer present as an inductor).

Each inductor is powered in forward direction (positive current) and after a short deactivation break is powered in the reverse direction (negative current flowing through the air-coil).

The coils L1 to L6 are driven by an identical supply voltage that is phase shifted with respect to a predecessor coil. The phase is shifted by 90° of quarter of Pi. One cycle 112 contains four different periods of time P1, P2, P3, P4 with a change of state between these periods of time.

The switching scheme will be explained in more detail below.

Figure 19:
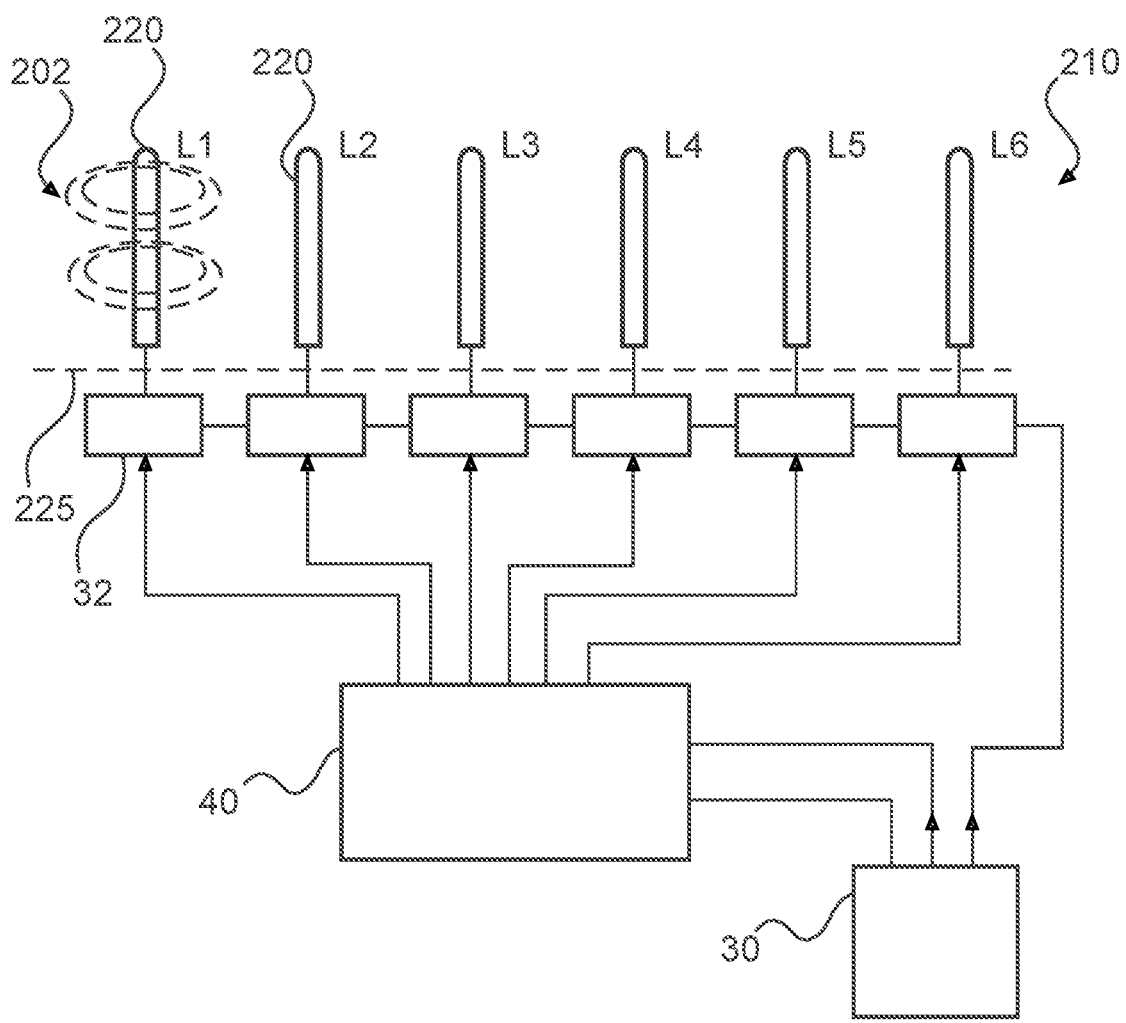
FIG. 19 schematically shows a magnetic field propulsion unit.

With reference to FIG. 17, FIG. 19 shows an alternative configuration of a magnetic field propulsion unit 202.

The propulsion unit 202 comprises six rod antennas 220. The rod antennas have the function of the coils 100 of FIG. 17. The rod antennas are parallel to each other and are arranged along a linear axis 225. The rod antennas 220 are driven by power drivers that are individually assigned to each of the antennas. A control unit 40 implements the switching scheme for the power supplied to the rod antennas. A deactivator unit is not needed in this example.

Figure 20:
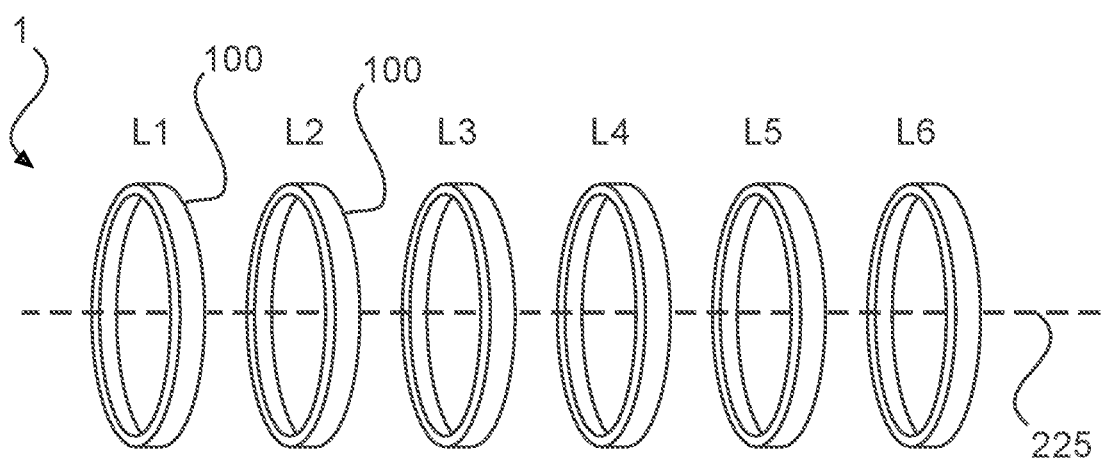
FIG. 20 schematically shows an arrangement of air coils of a magnetic field propulsion unit.

With further reference to FIG. 17, FIG. 20 shows an alternative arrangement of the air coils 100. The coils 100 may be arranged so that their axes coincide, and the center of the coils are arranged along a common axis 225.

Figure 21:
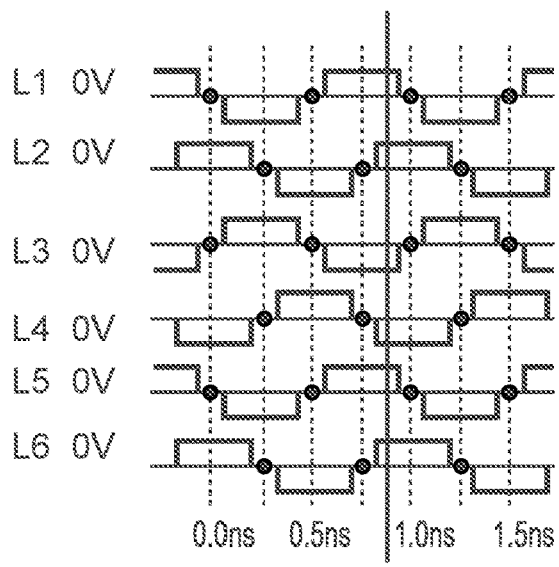
FIG. 21 schematically shows a switching state of a magnetic field propulsion unit.

In FIG. 21, a certain switching state of the magnetic field propulsion unit is shown and indicated by the solid vertical line shown at t=0.875 ns.

At the time 0.875 ns, an electric current is flowing through all of the six air coils L1 to L6. Looking from the top downwards onto the inductors (see FIG. 22), the first two inductors L1, L2 and the last two inductors L5, L6 show its north pole, and the inductors L3 and L4 show a south pole. The arrows show the forces with which the magnetic fields are attracted or repelled from each other.

Figure 23:
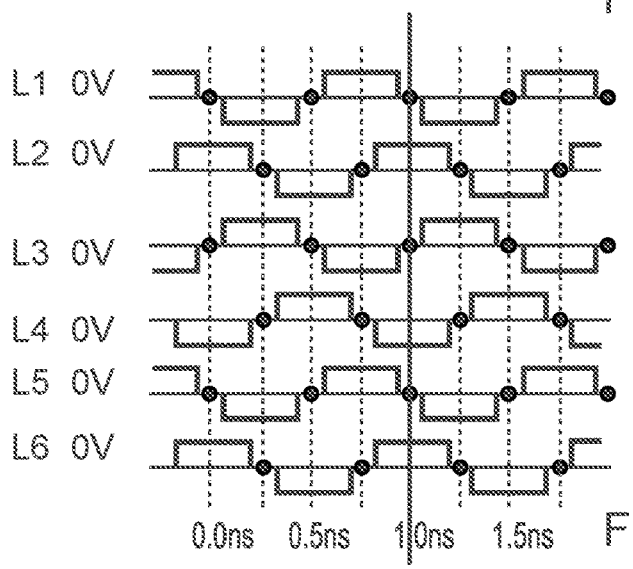
FIG. 23 schematically shows a switching state of a magnetic field propulsion unit.

FIG. 23 shows the status of the coils at t=1.0 ns, i.e., the scheme has moved forward compared to FIG. 12.

Figure 22:
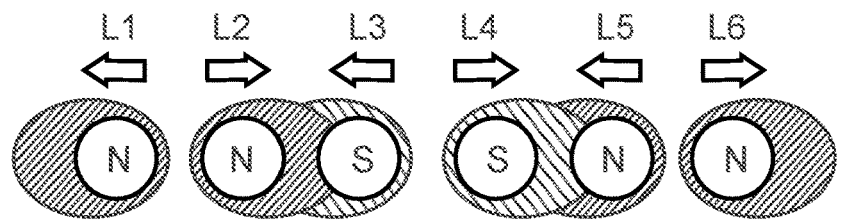
FIG. 22 schematically shows the forces exerted by the inductors of a magnetic field propulsion unit.
Figure 24:
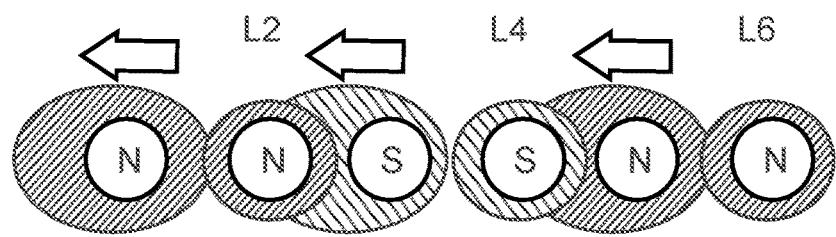
FIG. 24 schematically shows the forces exerted by the inductors of a magnetic field propulsion unit.

Given the change of the switching scheme from FIG. 21 to FIG. 23, this results in the effect indicated in FIG. 24.

At the time 1 ns, three of the inductors (namely L1, L3, L5) have been deactivated (the respective contact breakers 22 are open, the coils have changed their properties and are no longer present as a functioning inductor). Only the inductors L2, L4, and L6 remain and an electric current is flowing through each of these inductors. Depending in which direction the electric current flows through the inductor, either the north pole or the south pole will face up (when looking from the top downwards onto the remaining inductors, see FIG. 24). The magnetic field structures (clouds) from the formerly present inductors L1, L3, and L5 are no longer anchored to anything and expand in space. However, these three magnetic clouds will be repelled or attracted by the functioning and electric powered inductors L2, L4, and L6. This will make the not anchored magnetic clouds "move" into the same direction (towards the left in FIG. 24) and with this creating a small propulsion force in the opposite direction.

Figure 25:
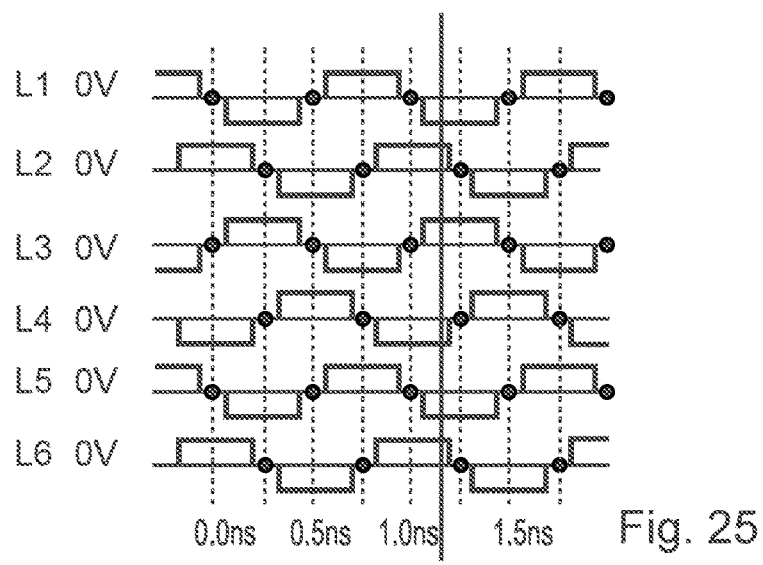
FIG. 25 schematically shows a switching state of a magnetic field propulsion unit.
Figure 26:
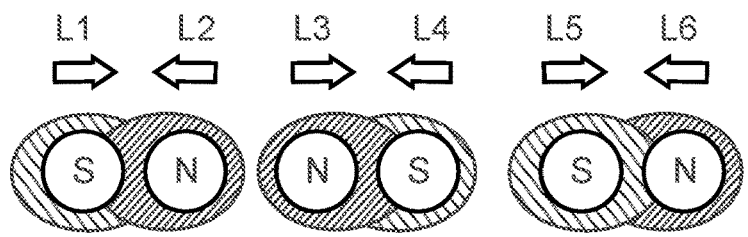
FIG. 26 schematically shows the forces exerted by the inductors of a magnetic field propulsion unit.

FIGS. 25 and 26 show the state at t=1.125 ns. The vertical solid line has moved to this time. All six inductors L1 to L6 are activated (supplied with current flowing in the indicated directions).

However, for the inductors L1, L3, L5, the direction of current has reversed compared to FIG. 21 (t=0.875 ns).

Figure 27:
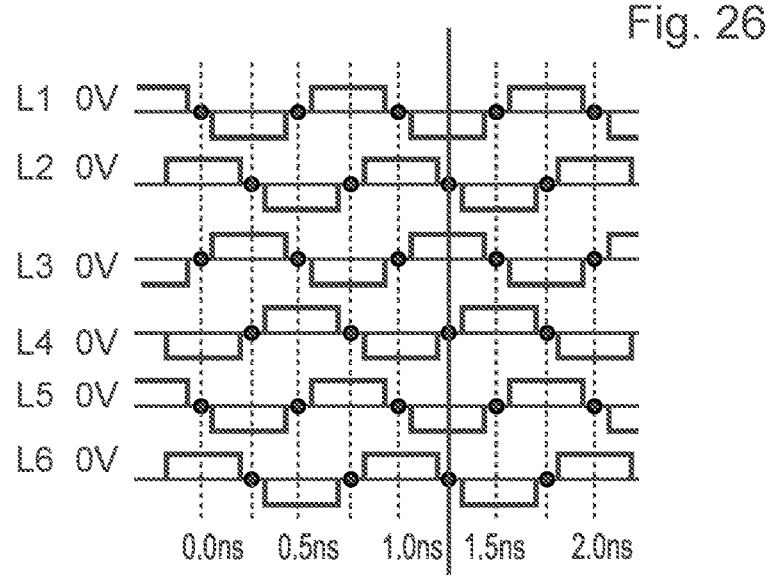
FIG. 27 schematically shows a switching state of a magnetic field propulsion unit.
Figure 28:
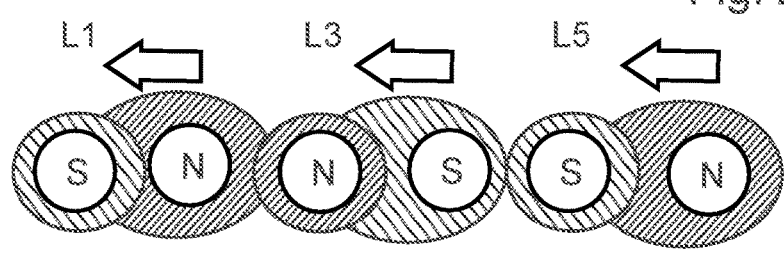
FIG. 28 schematically shows the forces exerted by the inductors of a magnetic field propulsion unit.

FIGS. 27 and 28 show the state at 1.250 ns. At the time 1.250 ns, only the three inductors L1, L3, L5 are functioning and an electric current is flowing through them. The other three inductors L2, L4, L6 have been deactivated and are no longer acting as an inductor. Just before the three no-longer-anchored magnetic structures (created by the former inductors L2, L4, and L6) have dispersed, they will be attracted or repelled by the three remaining and functioning inductors L1, L3, L5 into one and the same direction (towards the left in the picture above). A small propulsion force created by each of them is generated in the opposite direction.

Considering the magnetic activities of four successive time events (0.875 ns, 1.000 ns, 1.125 ns, and 1.250 ns) the creation of small pulsed propulsion forces into the same direction can be observed.

Figure 29:
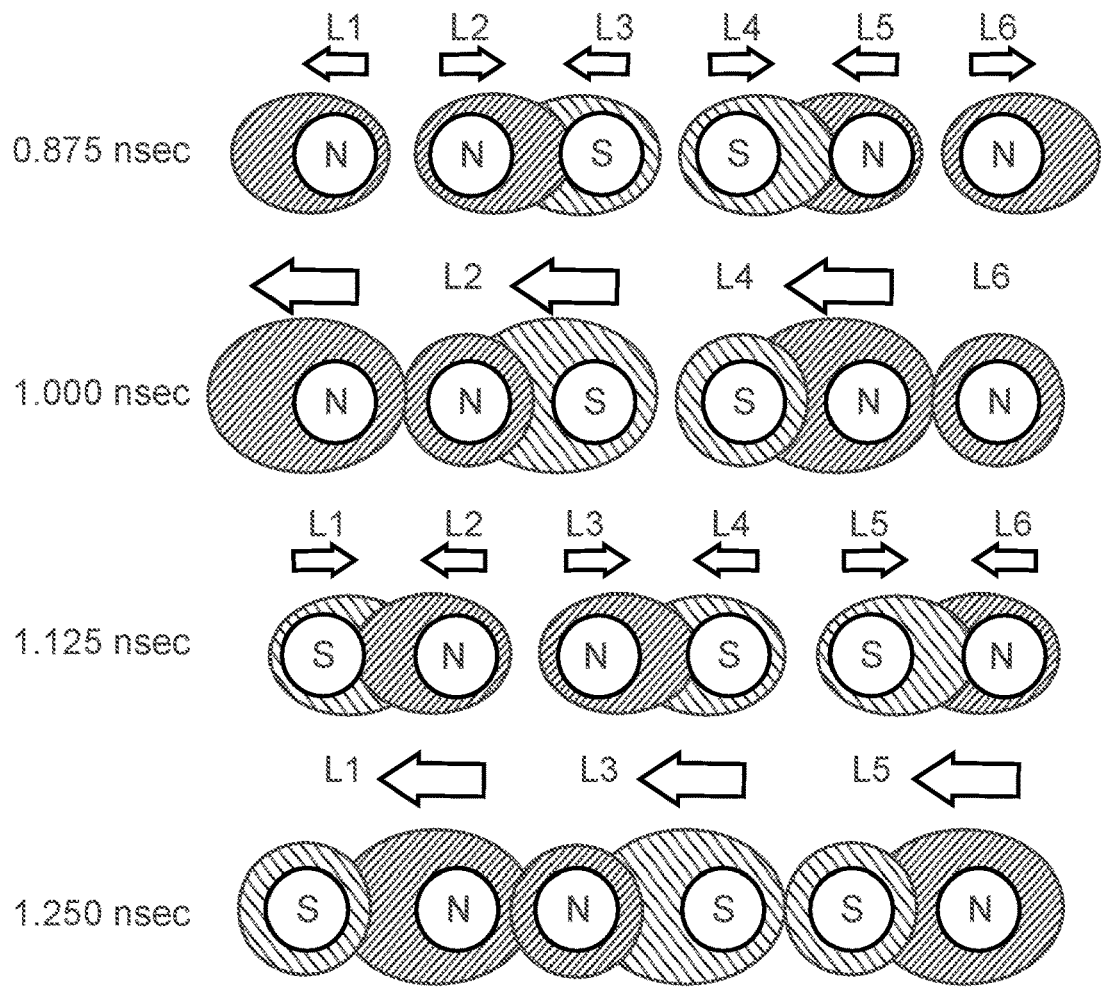
FIG. 29 shows the state of the inductors at four different points of time.

FIG. 29 summarizes the states of the coils L1 to L6 shown in FIG. 21 through 28 with the changing states and magnetization of the respective coils. At four successive time intervals, the magnetic activities and the creation of pulsed propulsion forces are shown for six inductors that are placed side-by-side.

Figure 30:
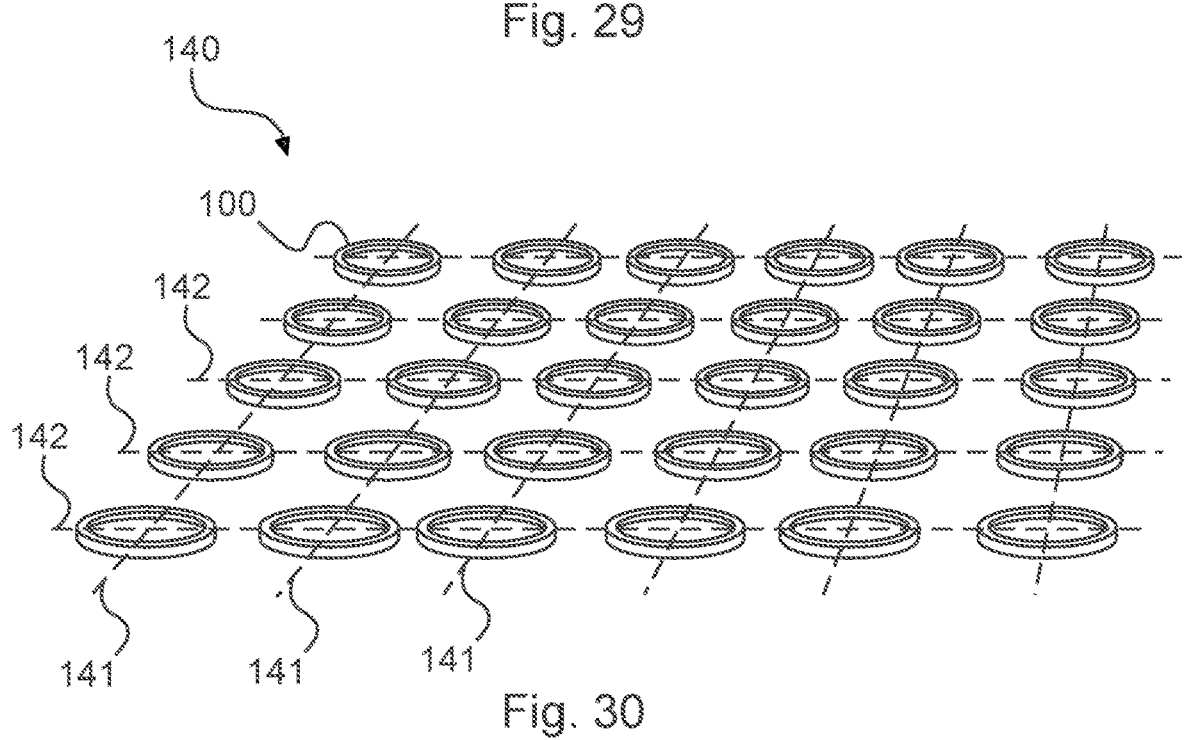
FIG. 30 schematically shows a magnetic field propulsion unit.

FIG. 30 schematically shows an array of coils 100 which represent a magnetic field propulsion unit building up a matrix structure 140. The coils are arranged in columns 141 and rows 142. In these columns and rows, the coils are arranged such that the center of the coils are arranged along a common linear (vertical and horizontal) axis. Each row 142 is made up of six coils. However, each row may have more or less than six coils. The number of columns is not limited as such. The magnetic field propulsion unit may comprise one or multiple columns. Each column corresponds to the arrangement shown in FIG. 15 through 20 and implementing the switching scheme described with reference to FIG. 21 through 29.

The array of coils shown in FIG. 30 allows to create a force in any direction in the X-Y-plane defined by the direction of the columns and rows without having to rotate the two-dimensional magnetic field propulsion unit.

Figure 31:
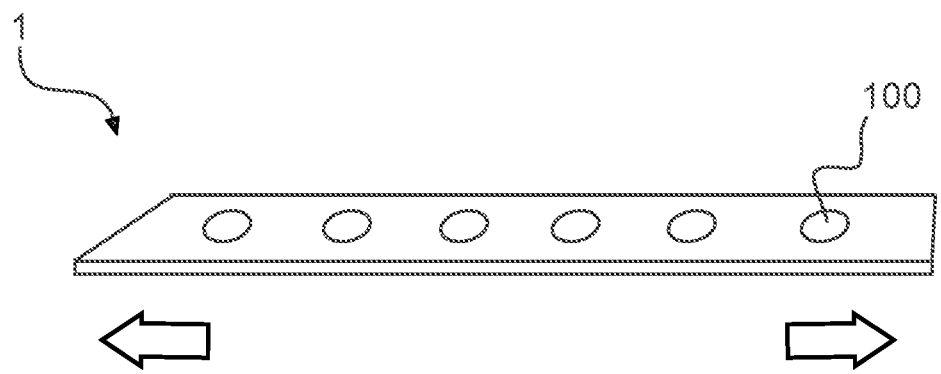
FIG. 31 schematically shows a magnetic field propulsion unit.

FIG. 31 schematically shows a one-dimensional magnetic field propulsion unit with a single row of coils 100. This magnetic field propulsion unit can create a propulsion force to the left or to the right.

Figure 32:
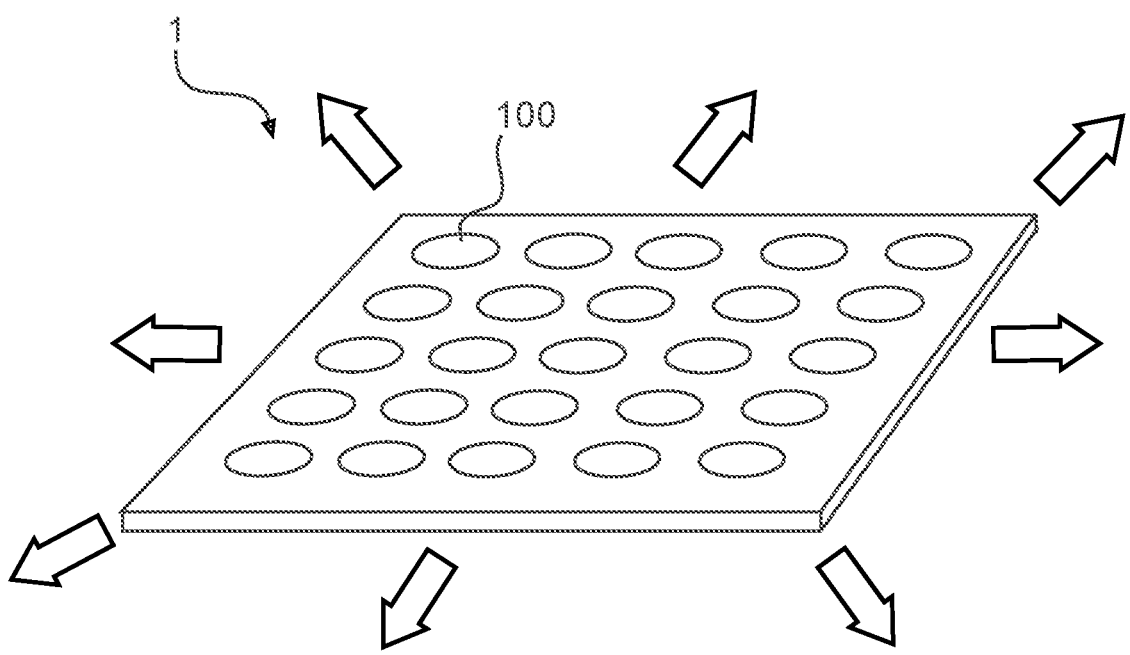
FIG. 32 schematically shows a magnetic field propulsion unit.

FIG. 32 shows a two-dimensional magnetic field propulsion unit. As already described with reference to FIG. 30, such a two-dimensional magnetic field propulsion unit with several rows and columns of air coils placed side-by-side allows the creation of propulsion forces in any direction of this plane without having to turn the array in a preferred direction.

Other air-coil arrangements and the appropriate control algorithm will allow the two-dimensional array to even rotate in any of the horizontal directions.

It should be understood that the features described in individual exemplary embodiments may also be combined with each other. While certain representative embodiments and details have been shown for the purpose of illustrating the subject invention, it will be apparent to those skilled in this art that various changes and modifications can be made therein without departing from the scope of the subject invention.

LIST OF REFERENCE SIGNS 1 magnetic field propulsion unit
10 magnetic field generating device
20 contact breaker arrangement
22 contact breaker
30 energy supply unit
32 power driver
34 deactivation unit
40 control unit
50 field lines of the magnetic field
100 conductive line, coil
102 inner chamber
104 semi-conductive fluid
106 energy supply lines
108 distance between adjacent or neighboring coils
110 longitudinal axis
112 cycle
114 plane
116 first section
118 second section
122 magnetic field intensity
124 center of the rod antenna
125 first interface
126 second interface
127 third interface
128 fourth interface
140 matrix structure
141 columns 142 rows
202 electromagnetic field propulsion unit
210 electromagnetic field generating device
220 generating unit, antenna
225 linear axis

The invention claimed is:

1. A magnetic field propulsion unit, comprising: a magnetic field generating device with multiple conductive lines which are configured to conduct a current so as to generate a magnetic field;
   a contact breaker arrangement configured to individually transition each of the multiple conductive lines from a conductive state to a non-conductive state;
   an energy supply unit configured to provide the magnetic field generating device with electrical energy; and
   a control unit configured to control the energy supply unit so that energy supply to each individual conductive line is controlled and to control the contact breaker arrangement,
   wherein the multiple conductive lines are arranged along a longitudinal axis,
   wherein the control unit is configured to:
      supply a first conductive line with electrical energy so that a first magnetic field surrounding the first conductive line is generated,
      transition the first conductive line to a non-conductive state, and
      supply a second conductive line with electrical energy so that a second magnetic field is generated,
   wherein the second conductive line is supplied with electrical energy a predetermined period of time after the first conductive line is transitioned to the non-conductive state, and
   wherein at least one of the conductive lines is tubular and has an inner chamber that is filled with a semi-conductive liquid.

2. The magnetic field propulsion unit of claim 1, wherein each of the conductive lines is a coil having at least one winding.

3. The magnetic field propulsion unit of claim 2, wherein the coils are identical in size and have the same number of windings.

4. The magnetic field propulsion unit of claim 2, wherein the coils are arranged in a linear manner and are equally spaced apart from each other at a predetermined distance.

5. The magnetic field propulsion unit of claim 2, wherein the coils are planar coils.

6. The magnetic field propulsion unit of claim 2, wherein the coils are planar coils which arranged in the same plane.

7. The magnetic field propulsion unit of claim 1, wherein the coil is an air coil without a core.

8. The magnetic field propulsion unit of claim 1, wherein the coil has a diameter between 10 mm and 200 mm.

9. The magnetic field propulsion unit of claim 1, wherein, for each conductive line, the control unit is configured to repeatedly carry out the following cycle, the cycle is referred to as a switching period:
   supply a positive current for a first period of time;
   transition the conductive line to a non-conductive state for a second period of time;
   supply a negative current for a third period of time; and
   transition the conductive line to a non-conductive state for a fourth period of time.

10. The magnetic field propulsion unit of claim 9, wherein a duration of the third period of time is equal to a duration of the first period of time.

11. The magnetic field propulsion unit of claim 9, wherein a duration of the fourth period of time is equal to a duration of the second period of time.

12. The magnetic field propulsion unit of claim 9, wherein the switching period of a first conductive line is phase-shifted for a quarter period with respect to a switching period of a second conductive line and wherein the first conductive line and the second conductive line are arranged next to each other with a predetermined distance in between such that the magnetic field propulsion unit generates a force pulse in a direction from the first conductive line to the second conductive line.

13. The magnetic field propulsion unit of claim 9, wherein the conductive lines are arranged in a matrix-like structure with multiple lines and columns and wherein the conductive lines in one column or in one line are controlled in accordance with the switching period so that any line and any column may be used as a magnetic field propulsion unit.

14. The magnetic field propulsion unit of claim 1, wherein the contact breaker arrangement comprises multiple contact breakers and wherein at least one contact breaker is assigned to each conductive line and arranged such that the contact breaker breaks the conductive line so that a flowing current through the conductive line is prevented.

15. The magnetic field propulsion unit of claim 14, wherein a contact breaker is a semiconductor element which is configured selectively be in (a) an electrically conductive state or (b) an electrically non-conductive state and wherein the contact breaker interconnects a first section of the conductive line with a second section of the conductive line so as to form a continuous conductive line when the semiconductor element is in the electrically conductive state.

16. The magnetic field propulsion unit of claim 14, wherein the contact breaker is a transistor.

17. A propulsion drive, comprising:
   a magnetic field propulsion unit according to claim 1,
   wherein the magnetic field propulsion unit is arranged such that a force pulse in a direction of the longitudinal axis is generated.

* * * * *